(12) United States Patent
Kimura

(10) Patent No.: US 8,854,700 B2
(45) Date of Patent: Oct. 7, 2014

(54) IMAGE READING APPARATUS

(75) Inventor: Keisuke Kimura, Ishikawa (JP)

(73) Assignee: PFU Limited, Ishikawa (JP)

( * ) Notice: Subject to any disclaimer, the term of this patent is extended or adjusted under 35 U.S.C. 154(b) by 0 days.

(21) Appl. No.: 13/369,035

(22) Filed: Feb. 8, 2012

(65) Prior Publication Data

US 2012/0314264 A1 Dec. 13, 2012

(30) Foreign Application Priority Data

Jun. 13, 2011 (JP) .................................. 2011-131359

(51) Int. Cl.
*H04N 1/04* (2006.01)

(52) U.S. Cl.
USPC ............ 358/474; 358/509; 358/473; 396/419

(58) Field of Classification Search
USPC .......... 358/474, 501, 475, 473, 509; 396/428, 396/419, 430
See application file for complete search history.

(56) References Cited

U.S. PATENT DOCUMENTS

| | | | |
|---|---|---|---|
| 4,811,110 A | 3/1989 | Ohmura et al. | |
| 5,218,200 A | 6/1993 | Morii et al. | |
| 5,515,181 A | 5/1996 | Iyoda et al. | |
| 5,548,120 A | 8/1996 | Parker et al. | |
| 5,625,183 A | 4/1997 | Kashitani et al. | |
| 5,743,633 A | 4/1998 | Chau et al. | |
| 5,760,925 A * | 6/1998 | Saund et al. | 358/497 |
| 5,764,383 A | 6/1998 | Saund et al. | |
| 5,818,612 A | 10/1998 | Segawa et al. | |
| 5,835,241 A | 11/1998 | Saund | |
| 5,861,622 A * | 1/1999 | Tsai | 250/234 |
| 5,969,829 A | 10/1999 | Matsuda et al. | |
| 5,978,102 A | 11/1999 | Matsuda | |
| 6,164,740 A | 12/2000 | Hirai et al. | |
| 6,185,010 B1 * | 2/2001 | Watanabe | 358/474 |
| 6,316,767 B1 | 11/2001 | Paxton et al. | |
| 6,325,288 B1 * | 12/2001 | Spitz | 235/462.12 |

(Continued)

FOREIGN PATENT DOCUMENTS

| | | |
|---|---|---|
| CN | 1510499 A | 7/2004 |
| JP | 63-037772 A | 2/1988 |

(Continued)

OTHER PUBLICATIONS

United States Office Action issued in U.S. Appl. No. 13/445,436 dated Sep. 11, 2013.

(Continued)

*Primary Examiner* — Negussie Worku
(74) *Attorney, Agent, or Firm* — McDermott Will & Emery LLP

(57) ABSTRACT

An image reading apparatus includes a main body, a rotation unit supported on the main body so as to be rotatable around a rotation axis, an imaging unit that is mounted on the rotation unit at an outward position in a radial direction of the rotation axis and images a medium to be read that is placed on a placement surface located under the rotation unit in the vertical direction, and a light source that irradiates the medium to be read with light. The light source and the imaging unit can be arranged with a relative positional relationship capable of suppressing specular reflected light of light that is emitted from the light source and reflected by the medium to be read from being incident on the imaging unit.

25 Claims, 13 Drawing Sheets

(56) References Cited

U.S. PATENT DOCUMENTS

| | | |
|---|---|---|
| 6,609,162 B1 | 8/2003 | Shimizu et al. |
| 6,738,166 B1 | 5/2004 | Kano et al. |
| 6,771,394 B1 | 8/2004 | Nakanishi et al. |
| 6,963,428 B1 * | 11/2005 | Gann .......................... 358/474 |
| 6,965,460 B1 * | 11/2005 | Gann et al. .................... 358/471 |
| 7,460,284 B2 | 12/2008 | Hiromatsu |
| 7,612,162 B2 | 11/2009 | Okada et al. |
| 7,652,781 B2 | 1/2010 | Fukui et al. |
| 7,724,390 B2 | 5/2010 | Imai |
| 7,730,191 B2 | 6/2010 | Otsuka et al. |
| 7,731,662 B2 * | 6/2010 | Anderson et al. ............. 600/459 |
| 7,916,331 B2 | 3/2011 | Shinozaki |
| 7,982,919 B2 | 7/2011 | Mishima et al. |
| 8,137,010 B2 * | 3/2012 | Yoshida et al. ............... 396/428 |
| 8,356,084 B2 | 1/2013 | Yamamoto |
| 8,416,474 B2 * | 4/2013 | Miyano et al. ................. 358/496 |
| 8,426,972 B2 * | 4/2013 | Kimura ......................... 257/765 |
| 8,503,045 B2 | 8/2013 | Kubo et al. |
| 8,587,845 B2 * | 11/2013 | Yonemura et al. ............. 358/498 |
| 8,686,885 B2 * | 4/2014 | Matsuura et al. ............. 341/120 |
| 2002/0093675 A1 | 7/2002 | Matsuda |
| 2004/0109615 A1 | 6/2004 | Nakamura |
| 2005/0175365 A1 | 8/2005 | Gomi |
| 2007/0041039 A1 | 2/2007 | Doui |
| 2010/0302607 A1 | 12/2010 | Hock |
| 2011/0299135 A1 | 12/2011 | Takabatake |
| 2011/0299136 A1 | 12/2011 | Kubo et al. |
| 2012/0314264 A1 | 12/2012 | Kimura |
| 2012/0320434 A1 | 12/2012 | Takeda |
| 2012/0320437 A1 | 12/2012 | Kanaya |

FOREIGN PATENT DOCUMENTS

| | | |
|---|---|---|
| JP | 63-107366 A | 5/1988 |
| JP | 09-050510 A | 2/1997 |
| JP | 09-261419 A | 10/1997 |
| JP | 2860119 B2 | 2/1999 |
| JP | 2982614 B2 | 11/1999 |
| JP | 3027915 B2 | 4/2000 |
| JP | 2000-307811 A | 11/2000 |
| JP | 2001-028671 A | 1/2001 |
| JP | 2002-111979 A | 4/2002 |
| JP | 2004-187111 A | 7/2004 |
| JP | 2004-187140 A | 7/2004 |
| JP | 2006-058663 A | 3/2006 |
| JP | 2006-166378 A | 6/2006 |
| JP | 2006-279828 A | 10/2006 |
| JP | 2007-037078 A | 2/2007 |
| JP | 2007-067966 A | 3/2007 |
| JP | 3931107 B2 | 6/2007 |
| JP | 2008-294676 A | 12/2008 |
| JP | 2008-311729 A | 12/2008 |

OTHER PUBLICATIONS

United States Office Action issued in U.S. Appl. No. 13/444,567 dated Nov. 4, 2013.
United States Office Action issued in U.S. Appl. No. 13/464,742 dated Sep. 19, 2013.
United States Office Action issued in U.S. Appl. No. 13/434,114 dated Sep. 5, 2013.
US Office Action issued in U.S. Appl. No. 13/075,720 dated Oct. 15, 2013.
US Office Action issued in U.S. Appl. No. 13/075,720 dated Apr. 2, 2013.
US Office Action issued in U.S. Appl. No. 13/111,498 dated Aug. 21, 2013.
US Office Action issued in U.S. Appl. No. 13/111,498 dated Jan. 25, 2013.
Japanese Office Action, w/ English translation thereof, issued in Japanese Patent Application No. JP 2010-114529 dated Jan. 28, 2014.
Japanese Office Action, w/ English translation thereof, issued in Japanese Patent Application No. JP 2010-127238 dated Jan. 21, 2014.
U.S. Office Action issued in U.S. Appl. No. 13/111,498 dated Apr. 10, 2014.
U.S. Office Action issued in U.S. Appl. No. 13/445,436 dated May 22, 2014.
U.S. Office Action issued in U.S. Appl. No. 13/075,720 dated Jun. 2, 2014.
Chinese Office Action, w/ English translation thereof, issued in Chinese Patent Application No. CN 201210194550.2 dated Jun. 3, 2014.
Notice of Rejection issued in Japanese Patent Application No. 2011-131359 dated Aug. 12, 2014, w/English translation.

* cited by examiner

SUB-SCANNING DIRECTION
(LENGTH DIRECTION)
FRONT ◄─────► BACK

ILLUMINANCE
DISTRIBUTION

MAIN-SCANNING DIRECTION

ILLUMINANCE DISTRIBUTION
MAIN-SCANNING DIRECTION

IMAGE READING APPARATUS

CROSS-REFERENCE TO RELATED APPLICATIONS

This application is based upon and claims the benefit of priority from Japanese Patent Application No. 2011-131359, filed on Jun. 13, 2011, the entire contents of which are incorporated herein by reference.

BACKGROUND OF THE INVENTION

1. Field of the Invention

The present invention relates to an image reading apparatus.

2. Description of the Related Art

Image reading apparatuses have been known that read media to be read from the upper side in the vertical direction. For example, Japanese Laid-open Patent Publication No. 2001-28671 discloses an image reading apparatus including a stand having a support arm, scanning lighting means for irradiating a surface of a document with a light beam having a slit beam shape, and document image reading means (an imaging unit) provided on an upper portion of the support arm for reading a document image by the light beam reflected from the document surface.

When an imaging unit reads a medium to be read from the upper side in the vertical direction, an optical path length between the imaging unit and a reading target position on the medium to be read changes with the reading target position (not constant). For example, when images are read while the medium to be read is being scanned, the optical path length between the imaging unit and the medium changes as the reading progresses. As a result, a depth of field corresponding to the change level is required. As a method of reducing the depth of field, the imaging unit may be provided at a high height position. In this case, however, the size of the apparatus is increased. It has been desired that suppression of increase in the size of the image reading apparatus and reduction of the depth of field are achieved together.

SUMMARY OF THE INVENTION

It is an object of the present invention to at least partially solve the problems in the conventional technology.

According to an aspect of the present invention, an image reading apparatus includes a main body, a rotation unit supported on the main body and configured to be rotatable around a rotation axis, an imaging unit mounted on the rotation unit at an outward position in a radial direction of the rotation axis and configured to image a medium to be read that is placed on a placement surface located under the rotation unit in a vertical direction, and a light source configured to irradiate the medium to be read with light.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An image reading apparatus according to embodiments of the invention is explained in detail below with reference to accompanying drawings. The embodiments do not limit the invention. The constituent elements of the following embodiments include elements that the persons skilled in the art can easily assume or that are substantially the same as the elements known by those in the art.

First Embodiment

Figure 1:
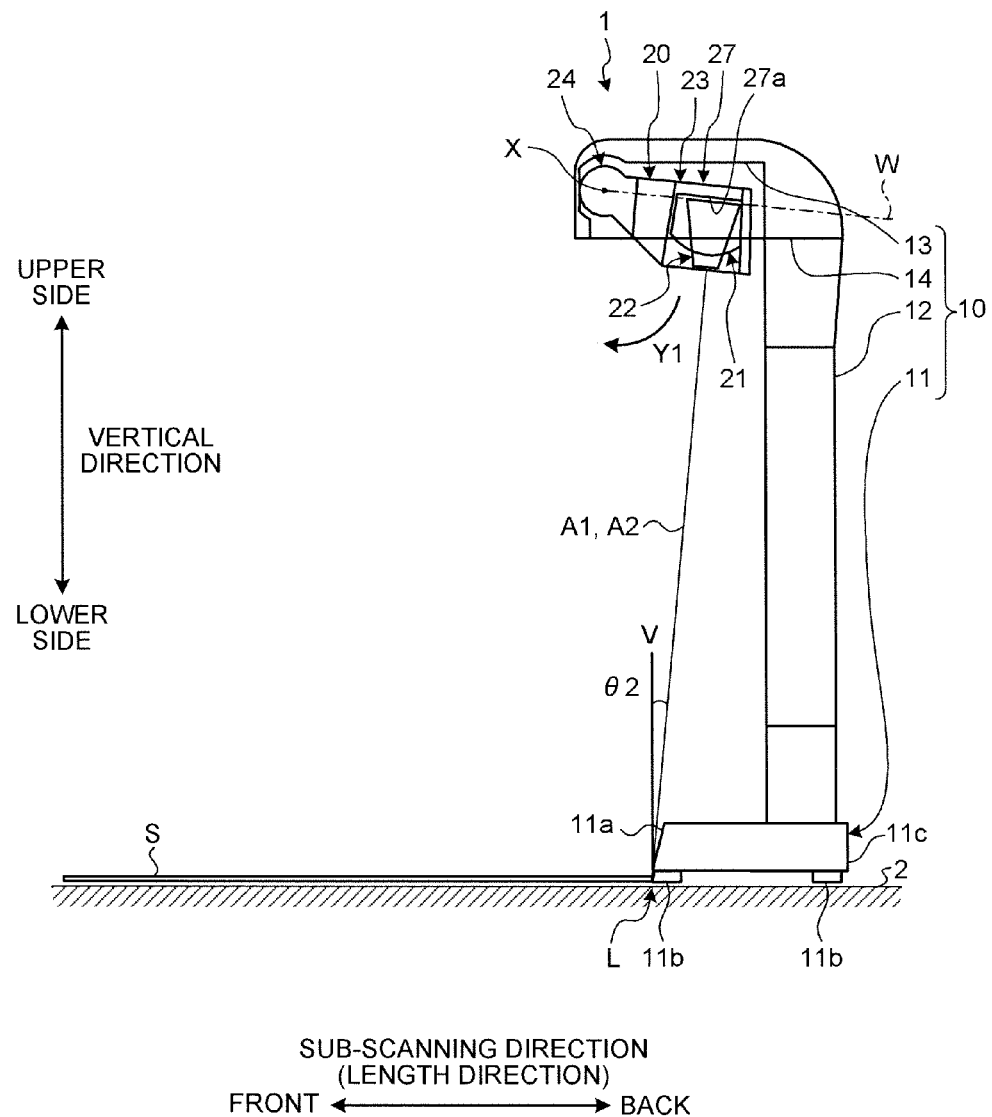
FIG. 1 is a side view of an image reading apparatus according to a first embodiment.
Figure 2:
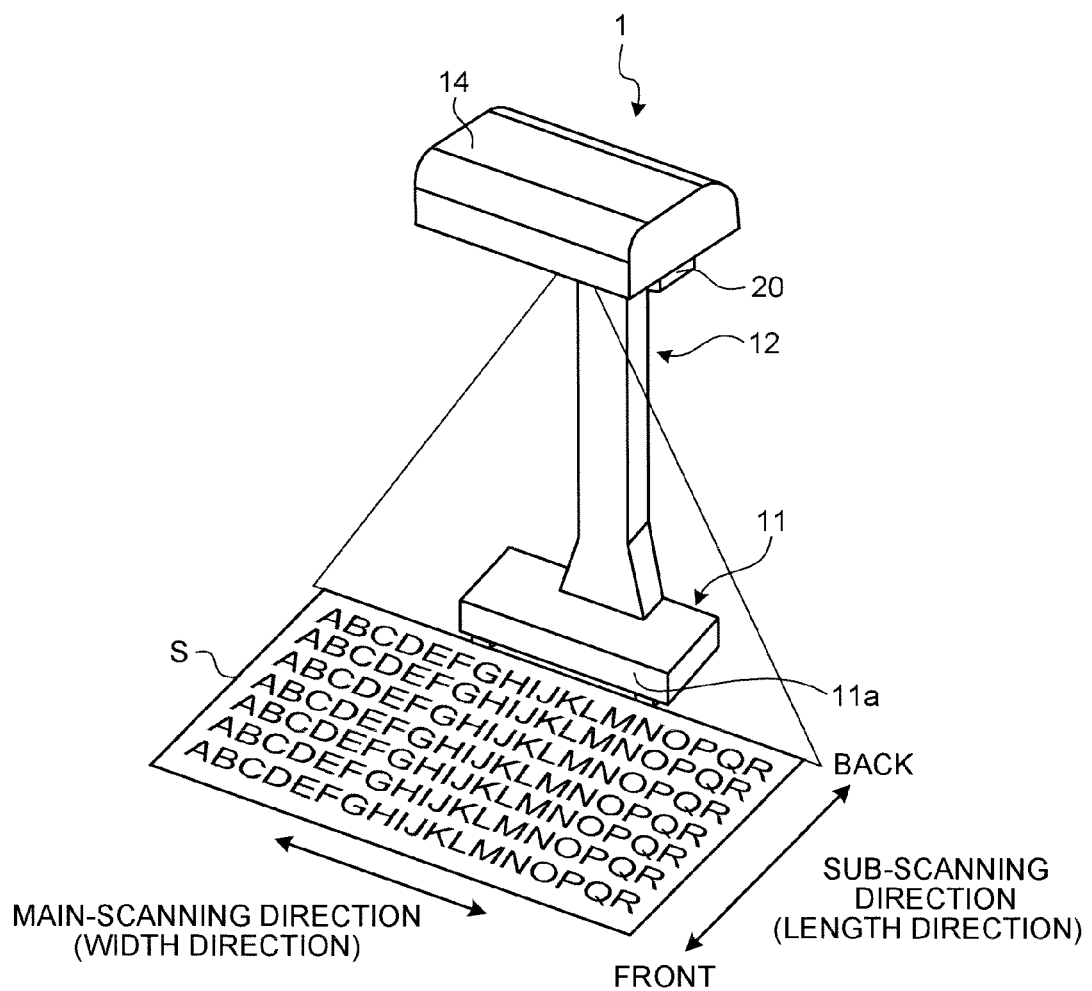
FIG. 2 is a perspective view of the image reading apparatus according to the first embodiment.
Figure 3:
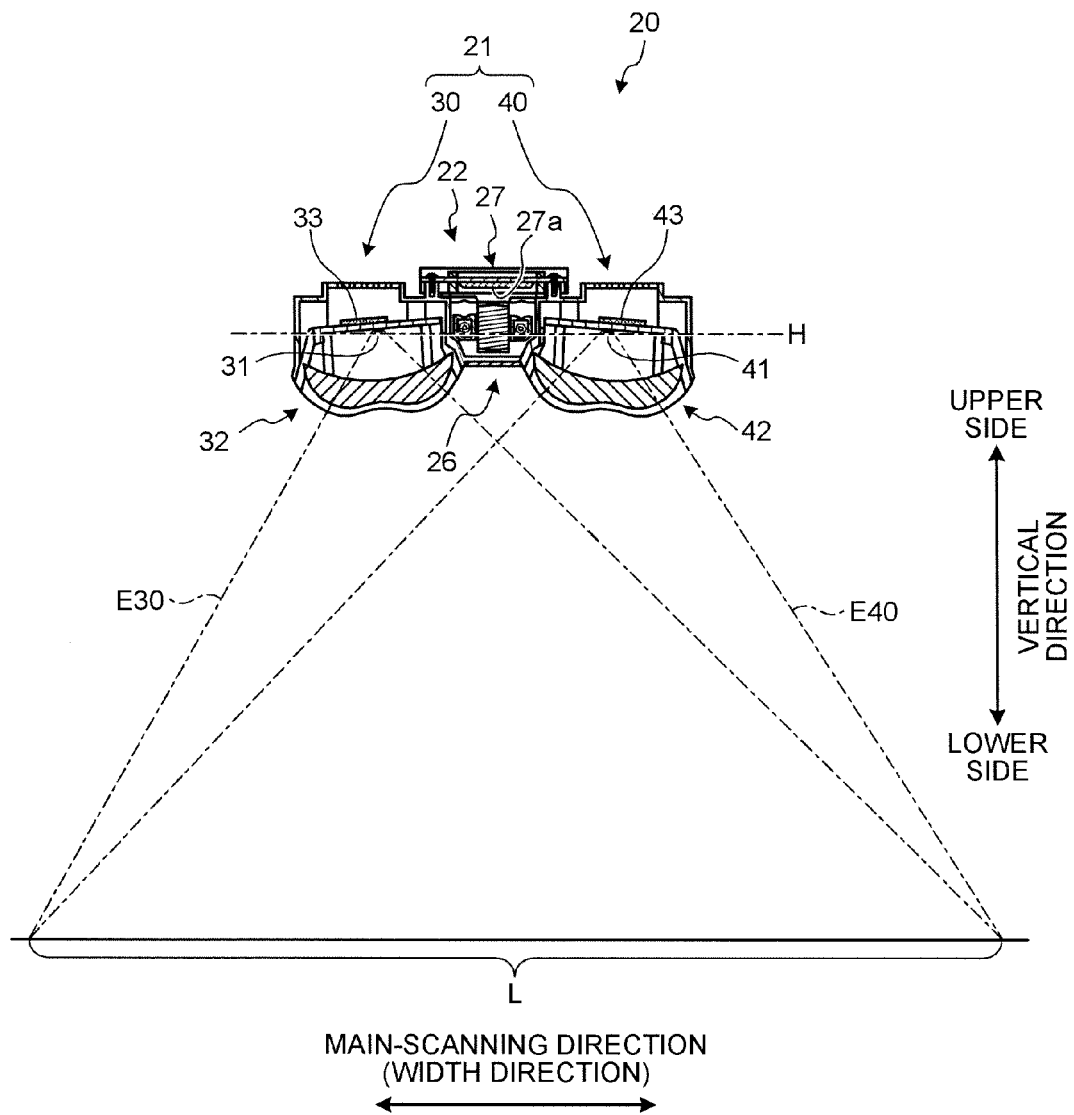
FIG. 3 is a front view of an optical unit according to the first embodiment.
Figure 4:
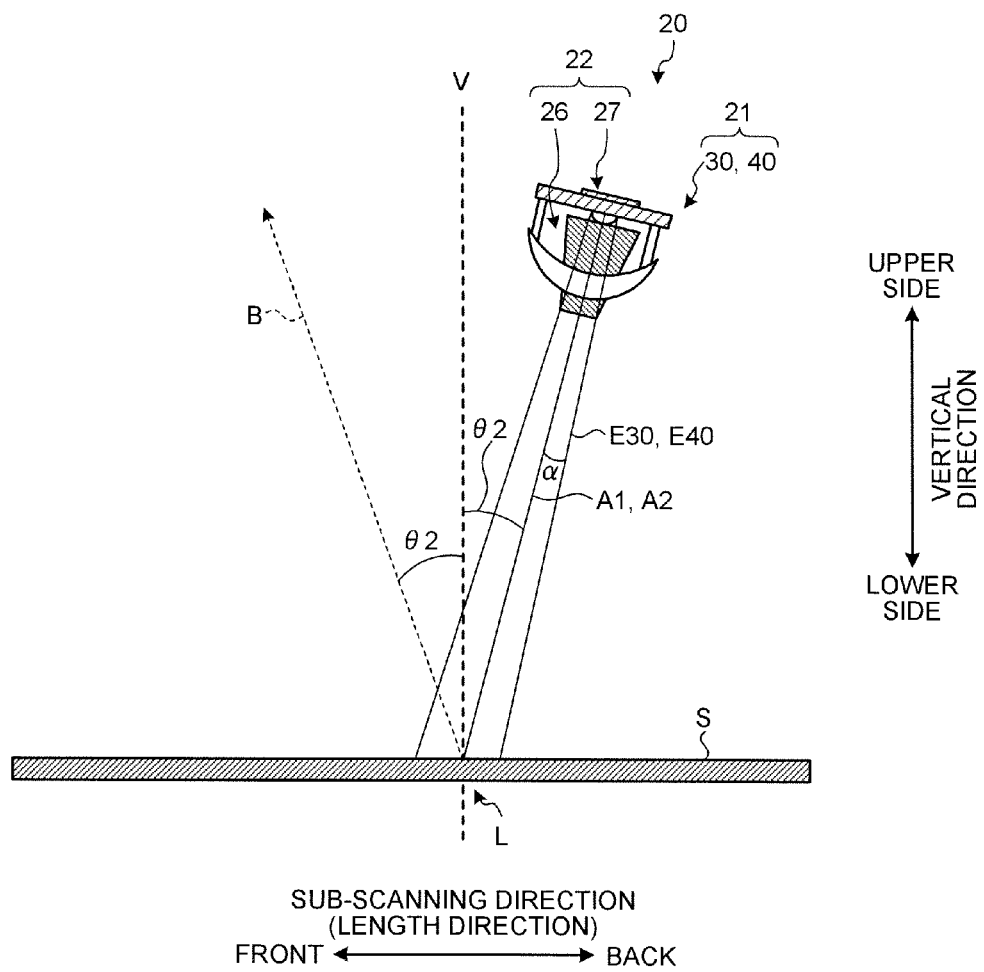
FIG. 4 is a side view of the optical unit according to the first embodiment.

A first embodiment is explained with reference to FIGS. 1 to 7. The first embodiment relates to an image reading apparatus. FIG. 1 is a side view of an image reading apparatus according to the first embodiment. FIG. 2 is a perspective view of the image reading apparatus according to the first embodiment. FIG. 3 is a front view of an optical unit according to the first embodiment. FIG. 4 is a side view of the optical unit according to the first embodiment.

An image reading apparatus 1 shown in FIGS. 1 and 2 is an overhead scanner. As shown in FIG. 1, the image reading apparatus 1 includes a main body 10 and an optical unit 20. The image reading apparatus 1 can read an image of a medium S to be read that is placed on a placement surface 2 located under the optical unit 20 in the vertical direction. The placement surface 2 is, for example, a flat surface such as a top surface of a desk.

An image reading apparatus that images the medium S to be read that is placed on the placement surface 2 from the upper side in the vertical direction has a problem in that a distance between an imaging unit thereof and the medium S largely changes with a reading target position. For example, as a method of producing two-dimensional image data of the medium S to be read by using a line sensor, the medium S is scanned by using a reflective member, such as a mirror, which is rotated around a rotation axis with respect to the line sensor that is fixed. In such a method, an optical path length between the imaging unit and the reading target position is small when the reading target position is directly below the optical unit 20, but the farther the reading target position is from the position directly below the optical unit 20 the larger the optical path length between the imaging unit and the reading target position. The large change of the optical path length between the imaging unit and the reading target position requires a large depth of field. The change of the optical path length may be reduced by providing the optical unit 20 at a higher position in the vertical direction so as to suppress increase in the depth of field. However, this structure results in increase in the size of the apparatus.

In the image reading apparatus 1 of the embodiment, the optical unit 20 is rotated around a rotation axis X like a pendulum. An imaging unit 22 is disposed at an outward position in a radial direction of the rotation axis X in the optical unit 20 and images the medium S to be read while being moved on a circle centered at the rotation axis X with the rotation around the rotation axis X. As explained below, this structure suppresses the change of the distance between the imaging unit 22 and the medium S to be read during the scanning of the medium S. The image reading apparatus 1 according to the embodiment can lower the mounting position (or height position) of the optical unit 20 in the vertical direction and reduce the depth of field together. In the present specification, the term "radial direction" means a radial direction perpendicular to the rotation axis X unless otherwise described. In addition, the term "axial direction view" means a view when viewed in an axial direction of the rotation axis X unless otherwise described, in the specification.

In the embodiment, the image reading apparatus 1 is placed on the same plane as the placement surface 2, as an example. The image reading apparatus 1, however, is not limited to be placed in this manner. The place on which the image reading apparatus 1 is placed may differ from the placement surface 2 on which the medium S to be read is placed. For example, the image reading apparatus 1 may be provided with a placement table having the placement surface 2.

The main body 10 includes a pedestal 11, an arm 12, a supporter 13 and a cover 14. The pedestal 11 is placed on the placement surface 2, for example, and supports the whole of the main body 10 as a base of the main body 10. Operation members such as a power source switch and an image-reading start switch are arranged on the pedestal 11, for example. The pedestal 11 has a flat shape, for example, and is placed such that a bottom surface thereof and the placement surface 2 face each other. The pedestal 11 has legs 11b on the bottom surface. The legs 11b are disposed at four corners on the bottom surface of the pedestal 11 so as to support the pedestal 11.

The pedestal 11 of the embodiment has a flat rectangular parallelepiped shape, or a similar or resembling shape thereof. The length in the vertical direction is smaller than both of the length in a width direction (a main-scanning direction, which is described later) and the length in a length direction (a sub-scanning direction, which is described later). The pedestal 11 may be shaped such that the length in the width direction is longer than the length in the length direction.

The medium S to be read is placed such that a side thereof abuts on a front surface 11a that is one of four side surfaces of the pedestal 11. For example, the medium S to be read is placed so as to abut on two of the legs 11b disposed on a side adjacent to the front surface 11a (also referred to as the front surface 11a side). That is, the medium S to be read is placed on the placement surface 2 such that a side thereof is parallel to the front surface 11a. In the embodiments, when the medium S to be read that has a rectangular shape is placed such that a side thereof abuts on the front surface 11a, a direction parallel to the side located on the front surface 11a side of the medium S is described as the "width direction" or the "main-scanning direction". A direction parallel to a side perpendicular to the side, which is located on the front surface 11a side, of the medium S is described as the "length direction" or the "sub-scanning direction". That is, in the length direction, a user is opposite the image reading apparatus 1 when the user faces the image reading apparatus 1 with the medium S to be read interposed therebetween. In the length direction, a direction heading from a back surface 11c to the front surface 11a is described as the front while a direction heading from the front surface 11a to the back surface 11c is described as the back. The back surface 11c and the front surface 11a are opposite to each other in the length direction out of four side faces of the pedestal 11.

The arm 12 is connected to the pedestal 11 and extends upward in the vertical direction from the pedestal 11. The arm 12 is formed in a pillar shape having a rectangular cross section or a chimney-like (or cylindrical) shape, for example. The lower portion of the arm 12 is formed in a tapered shape whose cross-section gradually increases as it extends downward (toward the lower side) in the vertical direction. More specifically, the length in the width direction of the lower portion of the arm 12 increases as the arm 12 extends toward the lower side in the vertical direction. The arm 12 is connected to an upper surface of the pedestal 11 on one side of the upper surface. Specifically, the arm 12 is connected to the upper surface of the pedestal 11 on the side adjacent to a side opposite the side on which the medium S to be read is placed, out of four sides forming the edge of the upper surface. In other words, the arm 12 is connected to an end on a side adjacent to the back surface 11c, which is remote from the medium S to be read, of the pedestal 11. The arm 12 is connected to a central portion of the pedestal 11 in the width direction.

The supporter 13 is connected to an upper end of the arm 12 in the vertical direction. The supporter 13 protrudes forward in the sub-scanning direction from the upper end of the arm 12. The supporter 13 protrudes on both sides in the width direction from the upper end of the arm 12. Specifically, the supporter 13 protrudes from the arm 12 on a placement side on which the medium S to be read is placed (also referred to as a medium S side) and on both sides in the width direction.

The pedestal 11 and the supporter 13 face each other in the vertical direction and the ends thereof located on a side opposite the medium S side in the length direction are connected with the arm 12. The supporter 13 protrudes forward in the length direction beyond the pedestal 11. That is, a front edge of the supporter 13 is located more forward than a front edge of the pedestal 11. As a result, at least a part of the supporter 13 and the medium S to be read face each other in the vertical direction when the medium S is placed on the placement surface 2 so as to abut on the pedestal 11.

The cover 14 is mounted on the rotation axis X of the optical unit 20 and covers the supporter 13 and the optical unit 20. The cover 14 covers the supporter 13 and the optical unit 20 from the upper side in the vertical direction and forms an outer shell, which includes the supporter 13 and the optical unit 20, of an upper portion of the main body. The cover 14 may be integrally formed with the supporter 13. The optical unit 20 may be supported by the cover 14 rotatably around the rotation axis X.

The optical unit 20 is a rotation unit that can rotate around the rotation axis X with respect to the main body 10. The rotation axis X extends straight in the width direction, i.e., in a direction parallel to the front surface 11a. That is, the rotation axis X is perpendicular to a vertical axis V. The vertical axis V coincides with the normal line of the placement surface 2. The optical unit 20 includes a light source 21, the imaging unit 22, a main body 23, and an axis unit 24. The axis unit 24 has a columnar shape and is supported by the supporter 13 rotatably around the rotation axis X with a bearing, for example, interposed therebetween. The rotation axis X is located at a position projected on the placement side with respect to the pedestal 11 from the upper end in the vertical direction of the arm 12 because the axis unit 24 is supported by the supporter 13. The main body 23 is connected to the axis unit 24 and extends from the axis unit 24 outward in the radial direction of the rotation axis X. For example, the main body 23 is a hollow material having a rectangular cross section in the axial direction view. The light source 21 and the imaging unit 22 are disposed inside the main body 23.

The supporter 13 is provided with a driving unit (not shown). The driving unit rotates the optical unit 20 around the rotation axis X. The driving unit includes an electric motor, and a transmission unit that connects a rotation axis of the motor and the optical unit 20, for example. The motor is a stepping motor, for example, and can control a rotational angle of the optical unit 20 with high accuracy. The transmission unit, which includes a combination of pulleys, belts, and worm gears, for example, reduces the rotation of the motor and transmits the reduced rotation to the optical unit 20.

The light source 21 includes a light emitting unit such as a light-emitting diode (LED) and can irradiate the medium S to be read with light from the upper side in the vertical direction. As shown in FIG. 3, the light source 21 includes a first lighting module 30 and a second lighting module 40. The first lighting module 30 includes an LED 31, a lens 32, and an LED substrate 33. Light emitted from the LED 31 is directed by the lens 32 downward in the vertical direction for irradiation. The second lighting module 40 includes an LED 41, a lens 42 and an LED substrate 43 in the same manner as the first lighting module 30. Light emitted from the LED 41 is directed by the lens 42 downward in the vertical direction for irradiation.

The first lighting module 30 and the second lighting module 40 are disposed with the imaging unit 22 interposed therebetween in the main-scanning direction. The first lighting module 30, the imaging unit 22, and the second lighting module 40 are arranged in a straight line manner in the main-scanning direction in this order. In the embodiment, the first lighting module 30, the imaging unit 22, and the second lighting module 40 are arranged on a single virtual line H parallel to the rotation axis X.

The imaging unit 22 is an image sensor including a charge coupled device (CCD), for example, and can image the medium S to be read that is placed on the placement surface 2. Specifically, the imaging unit 22 converts light that is reflected by a read image on a reading target line L and incident on the imaging unit 22 into electronic data by photoelectric conversion and produces image data of the read image. The imaging unit 22 further includes a reading lens 26 and a CCD 27. The CCD 27 is a line sensor including a plurality of pixels that read an image and are arranged in the main-scanning direction. The CCD 27 is disposed in the optical unit 20 such that the main-scanning direction is parallel to the rotation axis X. The reading lens 26 focuses light reflected from the medium S to be read on a light receiving surface 27a of the CCD 27. Each pixel of the CCD 27 receives light of the read image focused by the reading lens 26 on the light receiving surface 27a and outputs an electrical signal corresponding to the received light. The CCD 27 can read an image on the reading target line L of the medium S to be read and produce line image data in the main-scanning direction. The CCD 27 may be a single-line sensor or a multiple-line sensor.

The light source 21 irradiates an image on the reading target line L of the medium S to be read, i.e., a read image, with light. Each of the first lighting module 30 and the second lighting module 40 emits light having a slit beam shape. The first lighting module 30 emits irradiation light E30 while the second lighting module 40 emits irradiation light E40. Each of the irradiation light E30 and the irradiation light E40 spreads in the main-scanning direction, so that from one end to the other end of the medium S to be read can be irradiated. As shown in FIG. 4, an irradiation direction and an irradiation area are determined for each of the first lighting module 30 and the second lighting module 40 such that light spreads in the sub-scanning direction with a predetermined irradiation width. FIG. 4 depicts a cross section perpendicular to the rotation axis X. As shown in FIG. 4, an optical axis A1 of the light source 21 overlaps with an optical axis A2 of the imaging unit 22 in the axial direction view of the rotation axis X.

The light source 21 is adjusted such that the irradiation light E30 and the irradiation light E40 spread at an angle $\alpha$ with respect to the optical axis A1. The angle $\alpha$ is determined such that the width of the irradiation light in the sub-scanning direction on the medium S to be read is a predetermined value.

The image reading apparatus 1 can acquire a line image on the reading target line L at any position in the sub-scanning direction on the medium S to be read by adjusting a rotational position of the optical unit 20 around the rotation axis X. The image reading apparatus 1 can acquire image data of the whole of the medium S to be read by repeating the acquisition of the line image data and positional adjustment of the reading target line L by rotating the optical unit 20. That is, in the image reading apparatus 1, the document surface (or medium S) is scanned with irradiation light of the light source 21 in the sub-scanning direction and the imaging unit 22 reads an image of the reading target line L irradiated with light, resulting in the image of the medium S to be read being produced. For example, the image reading apparatus 1 produces two-dimensional image data of the medium S to be read by reading a line image of each reading target line L while the position of the reading target line L is sequentially shifted from the back to the front in the length direction.

In the image reading apparatus 1 of the embodiment, the imaging unit 22 is rotated together with the optical unit 20, and scans and images the medium S to be read while being moved on the circle centered at the rotation axis X with the rotation around the rotation axis X. As a result, the change of the optical path length between the imaging unit 22 and the reading target line L that is the reading target position is suppressed.

FIG. 1 depicts the optical unit 20 at the rotational position where the optical unit 20 images the rearmost side in a readable area thereof. Hereinafter, the rotational position of the optical unit 20 is described also as the "rearmost reading position". The optical unit 20 located at the rearmost reading position can read the side, which abuts on the front end of the pedestal 11, of the medium S to be read. The rearmost reading position is the rotational position of the optical unit 20 where the optical unit 20 starts reading images.

When the optical unit 20 is located at the rearmost reading position, the main body 23 is located more backward than the axis unit 24. The optical unit 20 located at the rearmost reading position extends nearly in the horizontal direction from the rotation axis X. Specifically, the optical unit 20 is slightly tilted in such a manner that it extends downward in the vertical direction as the distance from the rotation axis X increases in the radial direction. That is, the main body 23 is in such a tilted posture that an outside portion thereof in the radial direction is located more backward in the sub-scanning direction and more downward in the vertical direction than an inside portion thereof. The rearmost reading position is also a standby position when the optical unit 20 does not read images. That is, the optical unit 20 is located at the rearmost reading position and waits until a start of reading images is commanded when the optical unit 20 does not read images. The standby position may differ from the rearmost reading position. For example, the standby position may be a position at which the main body 23 is located more upward in the vertical direction than the rearmost reading position. In other words, the standby position may be a position to which the main body 23 is rotated in an opposite direction of an arrow Y1 direction from the rearmost reading position.

As shown in FIG. 1, the light source 21 and the imaging unit 22 face the placement surface 2 in the respective optical axis directions when the optical unit 20 is located at the position where the optical unit 20 starts reading the medium S to be read. In other words, the light source 21 and the imaging unit 22 can irradiate the placement surface 2 with light and read an image of the placement surface 2 when the optical unit 20 is located at the rearmost reading position. As shown in FIG. 1, both of the optical axis A1 of the light source 21 and the optical axis A2 of the imaging unit 22 do not intersect with the rotation axis X and are located away from the rotation axis X in the axial direction view. The optical axes A1 and A2 are tilted in such a manner that they extend forward as they extend downward in the vertical direction, with the optical unit 20 located at the rearmost reading position. In the axial direction view, the optical axes A1 and A2 intersect with a virtual line W extending outward in the radial direction from the rotation axis X through the light receiving surface 27a. In the embodiment, the optical axes A1 and A2 perpendicularly intersect with the virtual line W. In the axial direction view, the light source 21 and the imaging unit 22 are arranged on a single virtual line extending outward in the radial direction from the rotation axis X, e.g., on the virtual line W. The light source 21 and the imaging unit 22 may be arranged on a common virtual line extending in the radial direction different from the virtual line W passing through the light receiving surface 27a.

When reading of the medium S to be read starts from the rearmost reading position, the driving unit rotates the optical unit 20 in the arrow Y1 direction. In other words, the driving unit rotates the optical unit 20 so as to move the main body 23 downward in the vertical direction and forward. With the rotation, the reading target position of the imaging unit 22 moves to the front, so that the medium S to be read can be read sequentially from the back to the front. As the imaging unit 22 moves downward in the vertical direction with the rotation of the optical unit 20, the distance between the imaging unit 22 and the reading target line L in the vertical direction, i.e., a vertical direction component of the optical path length decreases. On the other hand, as a tilt angle θ2 of the optical axis A2 of the imaging unit 22 with respect to the vertical axis V increases with the rotation of the optical unit 20, the distance between the imaging unit 22 and the reading target line L in the sub-scanning direction, i.e., a sub-scanning direction component of the optical path length increases. In this way, with the rotation of the optical unit 20, the vertical direction component of the optical path length decreases and the sub-scanning direction component of the optical path length increases, thereby suppressing the change of the optical path length during the scanning of the medium S to be read.

Figure 5:
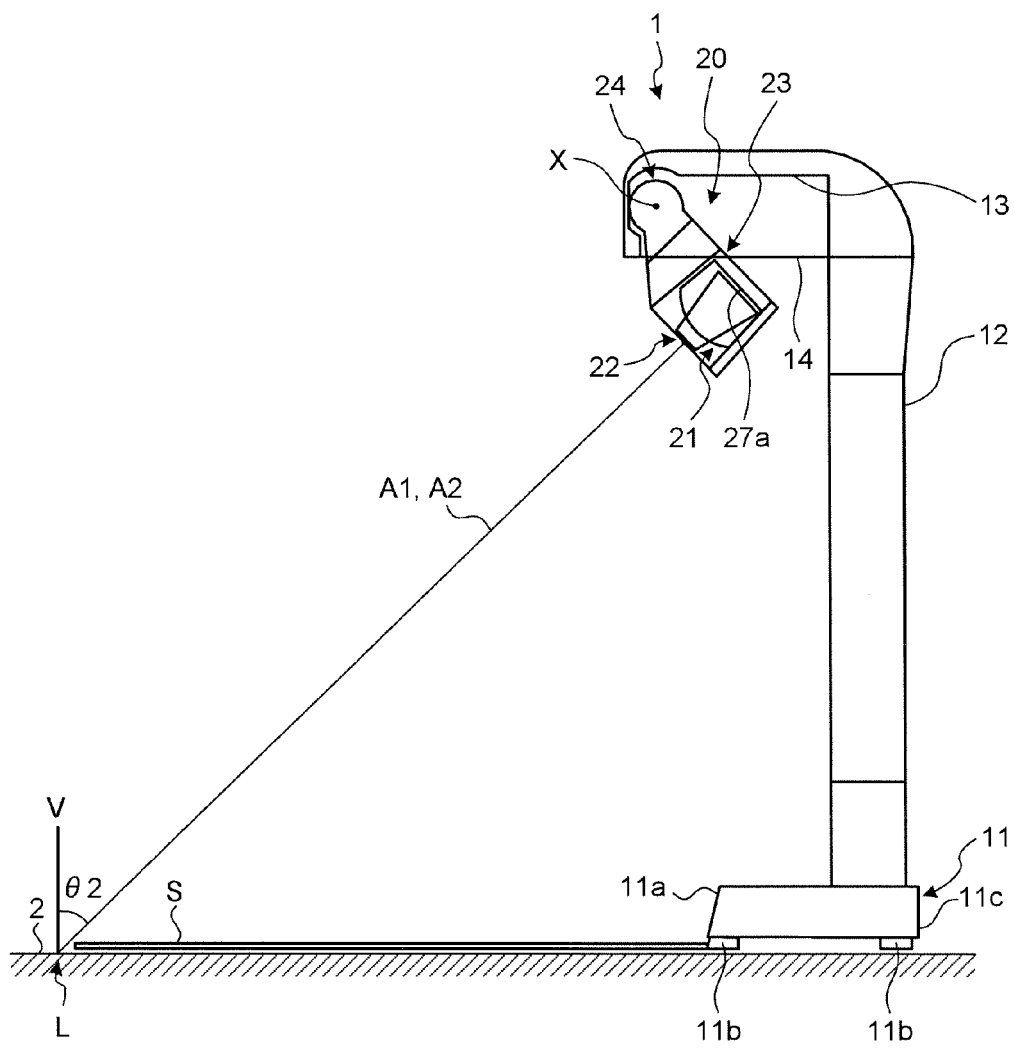
FIG. 5 is a side view of the image reading apparatus located at the front-end reading position.
Figure 6:
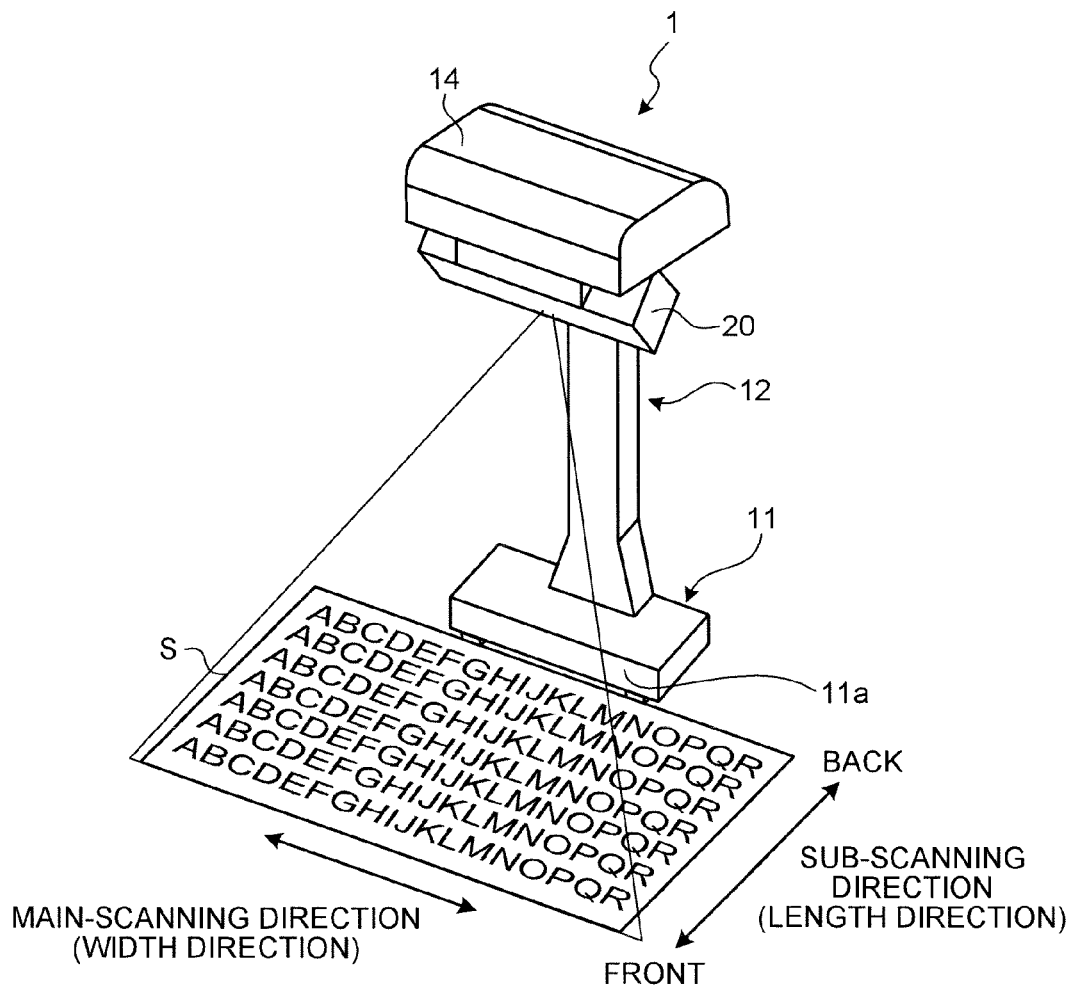
FIG. 6 is a perspective view of the image reading apparatus located at the front-end reading position.

FIG. 5 is a side view of the image reading apparatus 1 when the optical unit 20 is located at a rotational position where the optical unit 20 images the front-end side in the readable area. FIG. 6 is a perspective view of the image reading apparatus 1 when the optical unit 20 is located at the rotational position where the optical unit 20 images the front-end side in the readable area. Hereinafter, the rotational position of the optical unit 20 shown in FIG. 5 is described also as the "front-end reading position". When the optical unit 20 is located at the front-end reading position, the main body 23 is located on the lower side in the vertical direction with respect to the axis unit 24. The main body 23 is in such a tilted posture that the outside portion thereof in the radial direction is located more backward in the sub-scanning direction and more downward in the vertical direction than the inside portion thereof when the optical unit 20 is located at the front-end reading position. Meanwhile, the imaging unit 22 and the light source 21 are located more backward than the rotation axis X. The optical axis A2 of the imaging unit 22 is tilted in such a manner that it extends forward as it extends downward in the vertical direction. The tilt angle θ2 of the optical axis A2 with respect to the vertical axis V when the optical unit 20 is located at the front-end reading position is larger than the tilt angle θ2 when the optical unit 20 is located at the rearmost reading position (refer to FIG. 1).

In the image reading apparatus 1 of the embodiment, during the rotation of the optical unit 20 from the rearmost position to the front-end position, the vertical direction component of the optical path length continues to decrease while the sub-scanning direction component of the optical path length continues to increase with the rotation. That is, the vertical direction component and the sub-scanning direction component of the optical path length consistently continue the changes in the opposite direction to each other in relation to increase and decrease in the optical path length. As a result, a difference between the maximum and the minimum of the optical path length between the imaging unit 22 and the medium S to be read is reduced. For example, when the medium S of A3 size is read by the imaging unit 22 that is disposed at a height position of 350 mm and on the rotation axis X so as to be fixed at the position in the vertical direction unlike the embodiment, the maximum of the optical path length is 510 mm and the minimum is 350 mm. As a result, the difference is 160 mm. In contract, when the imaging unit 22 is disposed in the main body 23 of the optical unit 20 rotated in such a pendulum manner in accordance with the embodiment, the maximum of the optical path length can be suppressed to about 450 mm. In this case, the difference is reduced to about 100 mm.

As described above, the image reading apparatus 1 of the embodiment can reduce the depth of field without elevating the optical unit 20 to a higher height position. The height position of the optical unit 20, the position of the imaging unit 22 in the radial direction in the optical unit 20, and an intersection angle of the optical axis A2 with respect to the virtual line W connecting the rotation axis X and the light receiving surface 27a of the CCD 27, for example, can be determined appropriately as required. For example, based on given conditions, the dimensions and the angles may be set so as to reduce a change rate or a change amount of the optical path length as much as possible during the rotation of the optical unit 20 from the rearmost reading position to the front-end reading position.

In the embodiment, the light source 21 is mounted on the optical unit 20. With the rotation of the optical unit 20, the light source 21 irradiates the medium S to be read with light while being moved on the circle centered at the rotation axis X with the rotation around the rotation axis X. As a result, the change of the optical path length between the light source 21 and the reading target line L is suppressed and an illuminance change with positions in the sub-scanning direction is suppressed. In the same manner as the imaging unit 22, the vertical direction component of the optical path length between the light source 21 and the reading target line L decreases while the sub-scanning direction component of the optical path length increases with the rotation of the optical unit 20. Accordingly, the change of the optical path length between the light source 21 and the reading target line L is suppressed when the light source 21 scans the medium S to be read from the back end to the front end. As a result, the illuminance change with positions in the sub-scanning direction is suppressed, thereby improving quality of images produced by the image reading apparatus 1. In addition, the image reading apparatus 1 of the embodiment suppresses the height position of the optical unit 20 from being increased. As a result, illuminance of the reading target line L is ensured and image quality of produced images can be improved.

In the image reading apparatus 1 of the embodiment, specular reflected light is suppressed from being incident on the imaging unit 22 when images are read. Specular reflected light is light reflected in the specular reflection direction among incident light from the light source 21 when incident light is directly reflected without being diffused. In the overhead scanner that irradiates the medium S to be read with light from the upper side in the vertical direction and reads images, if intensive light reflected by the medium S to be read in the specular reflection direction is incident on the imaging unit 22, a portion received the intensive light may turn to a white spot. It is desired to suppress specular reflected light from being incident on the imaging unit 22 so as to improve image quality.

In the embodiment, the light source 21 and the imaging unit 22 are arranged with a relative positional relationship capable of suppressing specular reflected light that is transmitted by the light source 21 and reflected by the medium S to be read from being incident on the imaging unit 22. As shown in FIG. 4, the optical axis A1 of the light source 21 and the optical axis A2 of the imaging unit 22 overlap with each other in the axial direction view and the optical axes A1 and A2 are tilted in such a manner that they extend forward as they extend downward in the vertical direction, with the optical unit 20 located at the rearmost reading position. In this case, light emitted from the light source 21 is incident on the medium S to be read at the incident angle θ2. Specular reflected light B corresponding to the incident light is reflected by the medium S to be read at the reflection angle θ2 toward a side opposite the light source 21 side in relation to the vertical axis V. In the embodiment, the specular reflected light B travels in a direction different from a direction along which the specular reflected light B is incident on the imaging unit 22 at least when the optical unit 20 is located at the rearmost reading position because the light source 21 and the imaging unit 22 are arranged on the same axis in the axial direction view.

While the optical unit 20 is rotated to the front-end reading position shown in FIG. 5, the incident angle θ2 with respect to the medium S to be read changes. If the optical axes A1 and A2 are perpendicular to the medium S to be read in the axial direction view, i.e., the tilt angle θ2 with respect to the vertical axis V of each of the optical axes A1 and A2 is zero at any position in the movable area of the optical unit 20, the specular reflected light B is incident on the imaging unit 22.

The arrangement of the light source 21 and the imaging unit 22 of the embodiment is determined such that the tilt angle θ2 of each of the optical axes A1 and A2 in the axial direction view is not zero during the rotation of the optical unit 20 to the front-end reading position shown in FIG. 5. The tilt angle θ2 continues to increase during the rotation of the optical unit 20 from the rearmost reading position to the front-end reading position. This is because the movable area of the optical unit 20 is determined such that the main body 23 continues to move downward but does not pass through the lowest point during the rotation of the optical unit 20 from the rearmost reading position to the front-end reading position.

Accordingly, a direction of the tilt of each of the optical axes A1 and A2 is not reversed in relation to the vertical axis V during the rotation of the optical unit 20 to the front-end reading position. As a result, the specular reflected light B is suppressed from being incident on the imaging unit 22 while the optical unit 20 scans the medium S to be read in the sub-scanning direction and reads images. In this way, the image reading apparatus 1 of the embodiment suppresses a missing image due to entering of the specular reflected light B.

As described above, the image reading apparatus 1 of the embodiment can suppress the height positions of the light source 21 and the imaging unit 22 while suppressing increase in the required depth of field. As a result, the image reading apparatus 1 of the embodiment can extent the readable area while suppressing increase in the height of the apparatus, lowering of resolution, and lowering of illuminance on the medium to be read, for example.

In the optical unit 20 of the image reading apparatus 1 of the embodiment, the optical axis A1 of the light source 21 and the optical axis A2 of the imaging unit 22 are along the same axis in the axial direction view of the rotation axis X. That is, the light source 21 and the imaging unit 22 are arranged on the same straight line in the main-scanning direction. The light source 21 and the imaging unit 22 are fixed at the respective positions in the optical unit 20 and rotated around the rotation axis X with the rotation of the optical unit 20 without changing a mutual positional relationship. As a result, a difference is suppressed from being produced between an irradiation target position of the light source 21 and an imaging target position of the imaging unit 22.

For example, the light source 21 can irradiate the reading target line L serving as the imaging target of the imaging unit 22 with higher positional accuracy than when the light source 21 and the imaging unit 22 are independently driven and controlled from each other and when a reflective member guiding light to the imaging unit 22 and the light source 21 are independently driven and controlled from each other. As an example, the center of the reading target line L in the sub-scanning direction can coincide with the center of the irradiation width of light emitted from the light source 21 regardless of the rotational position of the optical unit 20. As a result, the image reading apparatus 1 of the embodiment suppresses the occurrence of light amount unevenness (or uneven illumination) and the like, and improves quality of produced images.

In addition, because the difference is suppressed from being produced between irradiation light of the light source 21 and the imaging target position of the imaging unit 22, the irradiation width in the sub-scanning direction of the light source 21 can be reduced and light amount can be intensively supplied on the reading target line L. As a result, the image reading apparatus 1 of the embodiment can read the medium S to be read with high image quality, high resolution, and high speed.

The image reading apparatus 1 of the embodiment does not interpose a reflective member such as a mirror between the medium S to be read and the imaging unit 22. This structure is free from the change of the optical path length due to reflection and can suppress deterioration of resolution.

In the image reading apparatus 1 of the embodiment, the imaging unit 22 is disposed away from the rotation axis X in the radial direction in the optical unit 20. This disposition can further improve control accuracy of reading positions than when the imaging unit 22 is disposed on the rotation axis X. From a point of view of improving the control accuracy, it is preferable that the imaging unit 22 be disposed from the rotation axis X with a large distance in the radial direction.

Figure 7:
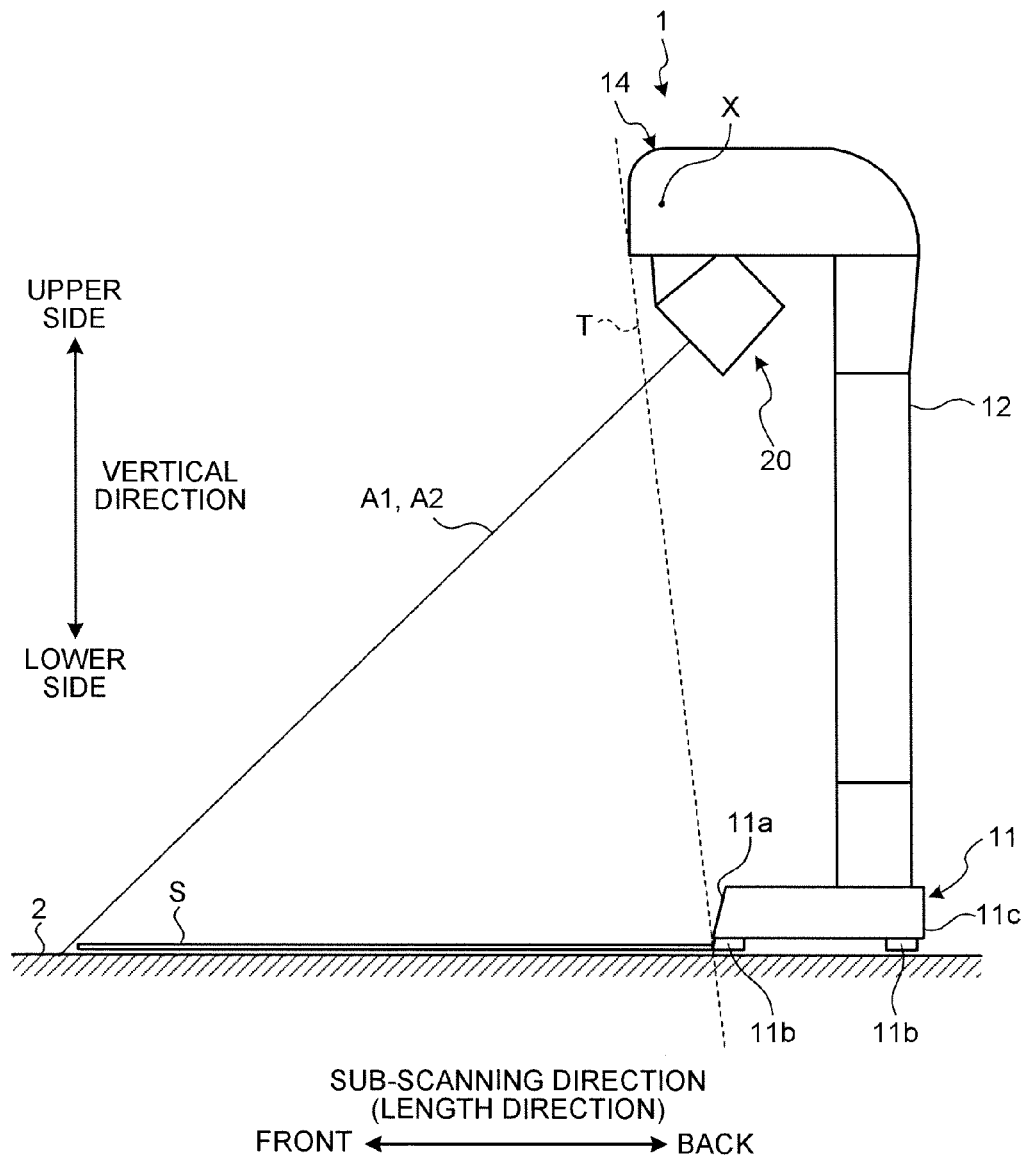
FIG. 7 is a schematic for explaining a structure that guards the optical unit.

The image reading apparatus 1 of the embodiment has a structure capable of guarding the optical unit 20 when it falls down. FIG. 7 is a schematic for explaining the structure that guards the optical unit 20. FIG. 7 depicts a state in which the optical unit 20 is located at the front-end reading position. The optical unit 20 located at the front-end reading position is located on a further back side in relation to a tangent line T of the pedestal 11 and the cover 14 on a front side. The front side is the placement side on which the medium S to be read is placed in relation to the pedestal 11 and the cover 14 while the back side is a side opposite the placement side in relation to the tangent line T. When the optical unit 20 is located at the front-end reading position, the optical unit 20 is located on the front-end side of the movable area. That is, the movable area of the optical unit 20 is on the side opposite the placement side in relation to the tangent line T.

Even if the main body 10 is tilted forward and falls down, the cover 14 hits the placement surface 2 first, followed by the optical unit 20 because of the structure. The cover 14 having hit the placement surface 2 supports the main body 10 together with the pedestal 11. In this way, the members located on a further back side from the tangent line T in the image reading apparatus 1 are suppressed from being hit on the placement surface 2. For example, the material of the cover 14 may be an elastically deformable material capable of absorbing shock by being deformed when colliding with the placement surface 2. Alternatively, the cover 14 may have a shock absorber capable of absorbing shock when a front edge thereof collides with an obstacle. The cover 14 thus structured can suppress the optical unit 20 from colliding with the placement surface 2 when the image reading apparatus 1 falls down and also guard the members including the optical unit 20 and the driving unit of the image reading apparatus 1 from shock by absorbing the shock due to the falling.

The light source 21 of the embodiment includes the lighting modules 30 and 40. However, the number of lighting modules is not limited to two. The imaging element of the imaging unit 22 is not limited to the CCD. Other known imaging elements such as a complementary metal oxide semiconductor (CMOS) sensor may be used.

FIRST MODIFICATION EXAMPLE OF THE FIRST EMBODIMENT

A first modification example of the first embodiment is explained with reference to FIGS. 8 and 9. In the first embodiment, the optical axis A1 of the light source 21 and the optical axis A2 of the imaging unit 22 are along the same axis in the axial direction view. The arrangement, however, is not limited to this manner. For example, the light source 21 and the imaging unit 22 may be arranged such that positions of the optical axes A1 and A2 differ from each other in the radial direction of the rotation axis X. For example, a distance between the rotation axis X and the light source 21 in the radial direction is equal to or more than a distance between the rotation axis X and the imaging unit 22 in the radial direction in the optical unit 20 when the positions of the light source 21 and the imaging unit 22 in the radial direction are set to be different from each other. This arrangement easily suppresses the specular reflected light B from being incident on the imaging unit 22.

The distance between the rotation axis X and the light source 21 can be defined as the distance between the rotation axis X and a representative position of the light source 21, for example. As an example, the distance between the rotation axis X and the LED 31 or the LED 41 can be employed. The distance between the rotation axis X and the imaging unit 22 can be defined as the distance between the rotation axis X and a representative position of the imaging unit 22, for example. As an example, the distance between the rotation axis X and the light receiving surface 27*a* of the CCD 27 can be employed.

As explained with reference to FIGS. 8 and 9 below, the relative positional relationship between the light source 21 and the imaging unit 22 is preferably determined such that no specular reflected light B is incident on the imaging unit 22 within the movable area of the optical unit 20. The relative positional relationship is preferably determined so as to suppress at least the specular reflected light B from being incident on the imaging unit 22. The relative positional relationship between the light source 21 and the imaging unit 22 includes a relative position between the light source 21 and the imaging unit 22 in the radial direction and a relationship between the angles of the optical axes A1 and A2 with respect to the virtual line W connecting the rotation axis X and the light receiving surface 27*a* of the imaging unit 22.

Figure 8:
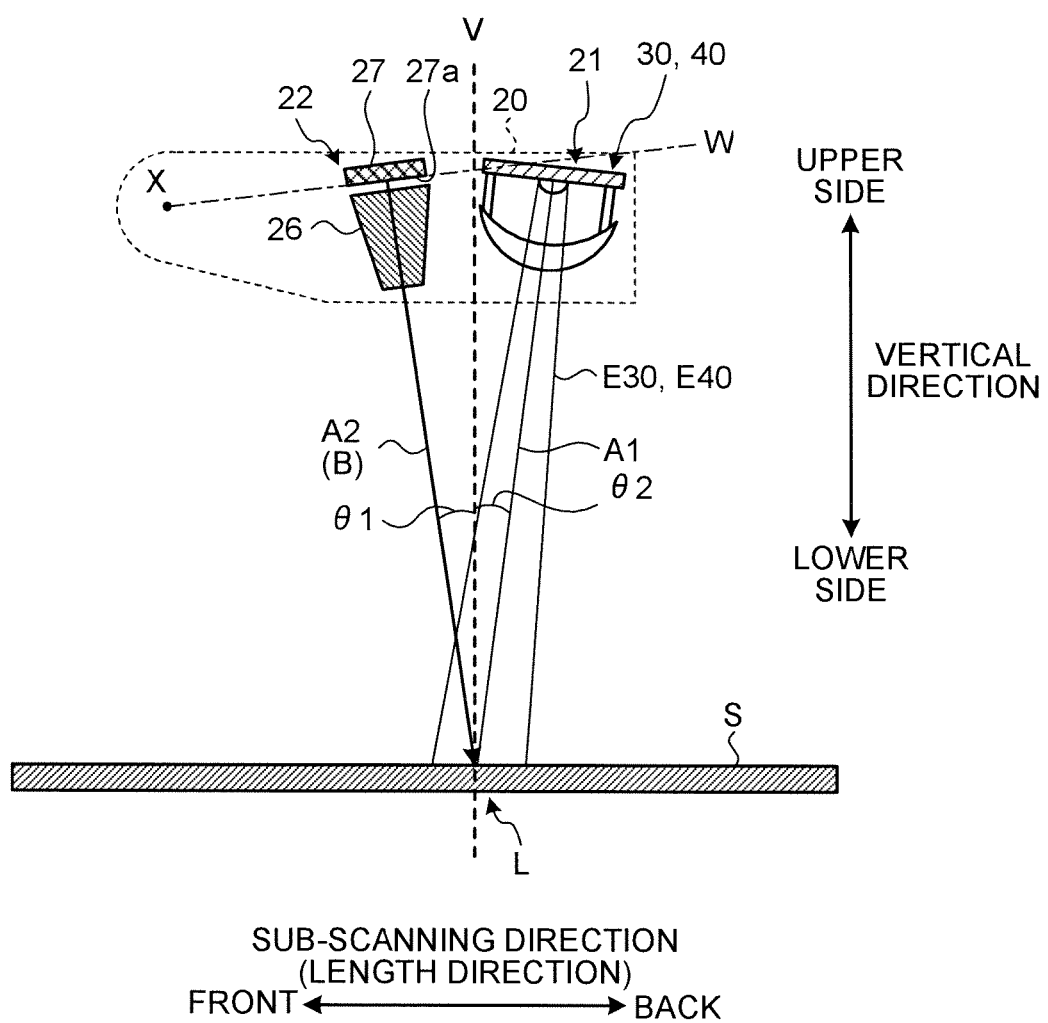
FIG. 8 is a schematic for explaining a relative positional relationship when specular reflected light is incident on an imaging unit.

FIG. 8 is a schematic for explaining the relative positional relationship when the specular reflected light B is incident on the imaging unit 22. FIG. 9 is a schematic for explaining the relative positional relationship when the specular reflected light B is not incident on the imaging unit 22. In FIGS. 8 and 9, an angle $\theta 1$ is a reflection angle of reflected light incident on the imaging unit 22 from the reading target line L and made between the optical axis A2 of the imaging unit 22 and the vertical axis V in the axial direction view. FIGS. 8 and 9 each depicts a state in which the reading target line L is located between the imaging unit 22 and the light source 21 in the sub-scanning direction. As shown in FIG. 8, when the reflection angle $\theta 1$ of light incident on the imaging unit 22 is equal to the reflection angle $\theta 2$ of the specular reflected light B that is specular reflected light of light emitted from the light source 21 to the reading target line L, the specular reflected light B is incident on the imaging unit 22. In other words, when the optical axis A2 of the imaging unit 22 overlaps with a specular reflection direction of light emitted from the light source 21 to the reading target line L in the axial direction view, the specular reflected light B is incident on the imaging unit 22.

Figure 9:
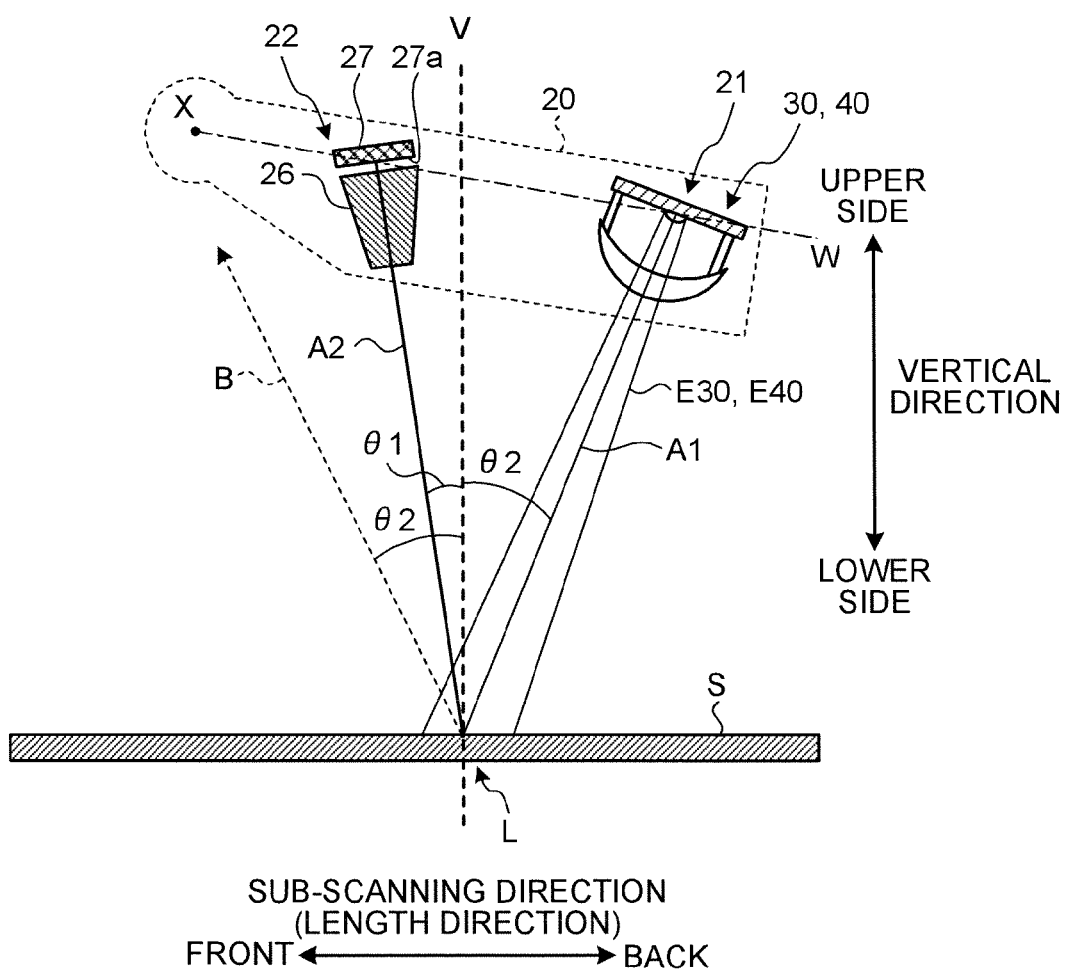
FIG. 9 is a schematic for explaining a relative positional relationship when no specular reflected light is incident on the imaging unit.

On the other hand, in the relative positional relationship shown in FIG. 9, the specular reflected light B is suppressed from being incident on the imaging unit 22. The reflection angle $\theta 1$ of light incident on the imaging unit 22 differs from the reflection angle $\theta 2$ of the specular reflected light B in magnitude. The specular reflected light B travels in a direction different from the direction toward the imaging unit 22. The light source 21 and the imaging unit 22 are preferably arranged so as to avoid the state that the specular reflected light B is incident on the imaging unit 22 as shown in FIG. 8 regardless of the position at which the optical unit 20 reads images in the movable area.

For example, the light source 21 and the imaging unit 22 may be located together on one side in relation to the reading target line L in the sub-scanning direction regardless of the reading position of the optical unit 20 in the movable area. That is, the light source 21 and the imaging unit 22 may be arranged together so as to be consistently on the front side or the back side in relation to the reading target line L. This arrangement suppresses the specular reflected light B from being incident on the imaging unit 22.

A magnitude relationship may not be changed between the magnitude of the incident angle θ2 of light emitted from the light source 21 to the reading target line L and the magnitude of the reflection angle θ1 of light that is reflected from the reading target line L and incident on the imaging unit 22 regardless of the reading position of the optical unit 20 in the movable area. For example, the light source 21 and the imaging unit 22 may be arranged so as to consistently satisfy the relationship that the magnitude of the incident angle θ2 of light emitted from the light source 21 to the reading target line L is larger than the magnitude of the reflection angle θ1 of light that is reflected from the reading target line L and incident on the imaging unit 22 as shown in FIG. 9. Such an arrangement suppresses the specular reflected light B from being incident on the imaging unit 22 regardless of the fact that the light source 21 and the imaging unit 22 are arranged together on one side or the other side in the sub-scanning direction in relation to the reading target line L.

The light source 21 and the imaging unit 22 may be arranged at different positions in a circumferential direction of the circle centered at the rotation axis X. For example, one of the light source 21 or the imaging unit 22 may be located forward in the rotational direction than the other.

SECOND MODIFICATION EXAMPLE OF THE FIRST EMBODIMENT

In the first embodiment, the light source 21 is mounted on the optical unit 20. The light source 21, however, is not limited to be disposed in this manner. For example, the light source 21 may be disposed on the arm 12, the supporter 13, or the cover 14 so as to be isolated from the optical unit 20. In this case, the light source 21 may be driven in synchronization with the rotation of the optical unit 20 so as to irradiate the reading target line L to be imaged by the imaging unit 22 with light. Alternatively, the light source 21 may be fixed on the main body 10, for example, and irradiate the whole of the medium S to be read with light. The light source 21 and the imaging unit 22 are preferably arranged with a relative positional relationship capable of suppressing the specular reflected light B of light that is transmitted from the light source 21 and reflected by the medium S to be read from being incident on the imaging unit 22.

Second Embodiment

A second embodiment is explained with reference to FIGS. 10 to 14. In the second embodiment, the elements having the same functions as the first embodiment are labeled with the same numerals and a detailed explanation thereof will not be repeated here. The image reading apparatus 1 of the second embodiment differs from the image reading apparatus 1 of the first embodiment in that the light source 21 is designed so as to uniform illuminance on the light receiving side of the CCD 27. In the embodiment, the light source 21 is designed such that a combined illuminance distribution of lighting of the first lighting module 30 and the second lighting module 40 meets a characteristic of the reading lens 26 of the imaging unit 22.

The illuminance distribution of the light source 21 is determined such that irradiation light amount of the light source 21 is large on an area of the medium S to be read from which the light receiving surface 27a receives relatively small light amount due to the characteristic of the reading lens 26 while irradiation light amount of the light source 21 is small on an area of the medium S from which the light receiving surface 27a receives relatively large light amount due to the characteristic of the reading lens 26. This illuminance distribution can suppress a dynamic range of the imaging unit 22 and reduce image noises in produced images.

Figure 10:
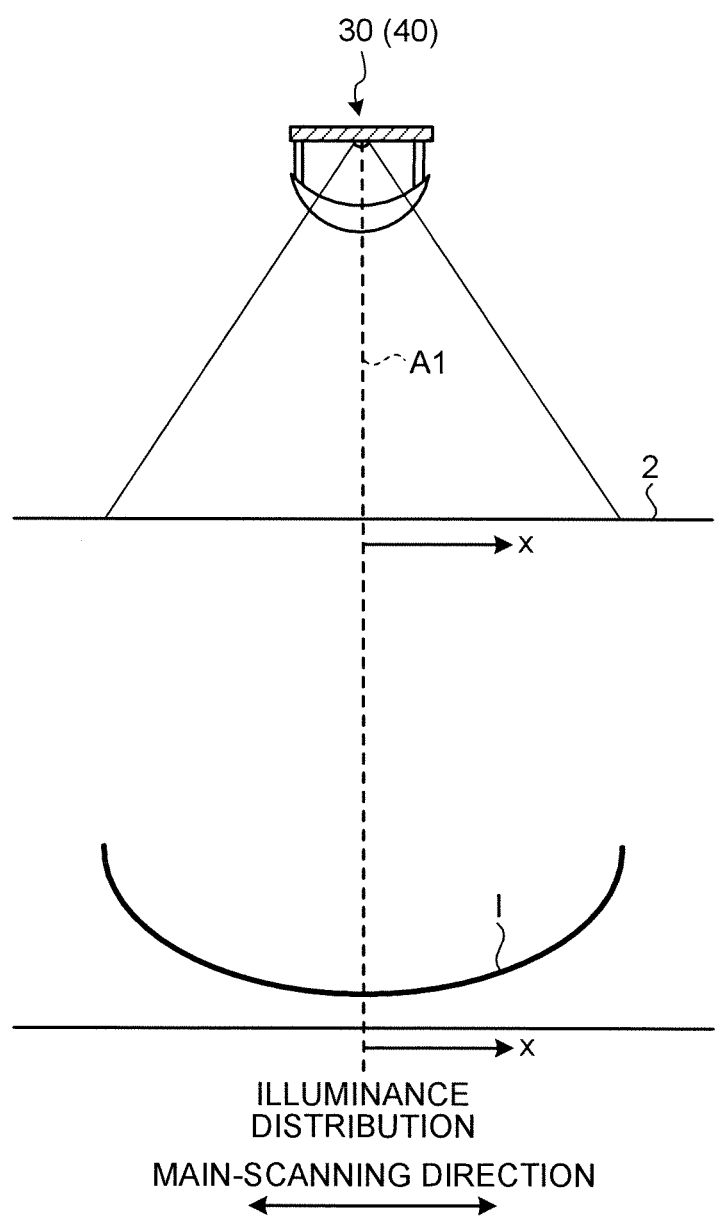
FIG. 10 depicts an illuminance distribution of a single lighting module.

FIG. 10 is a schematic of an illuminance distribution I when a single lighting module emits light for irradiation. In the embodiment, the first lighting module 30 and the second lighting module 40 have the same characteristic. The first lighting module 30 and the second lighting module 40 have the characteristic that the illuminance is minimum in the optical axis A1 direction and increases as the distance from the optical axis A1 increases toward both sides in the main-scanning direction. The curve of the illuminance distribution I has a shape warped on the minimum illuminance side. The first lighting module 30 and the second lighting module 40 are designed in such a manner that they have a greater increment of illuminance per unit change in the main-scanning direction as the distance from the optical axis A1 increases in the main-scanning direction.

Figure 11:
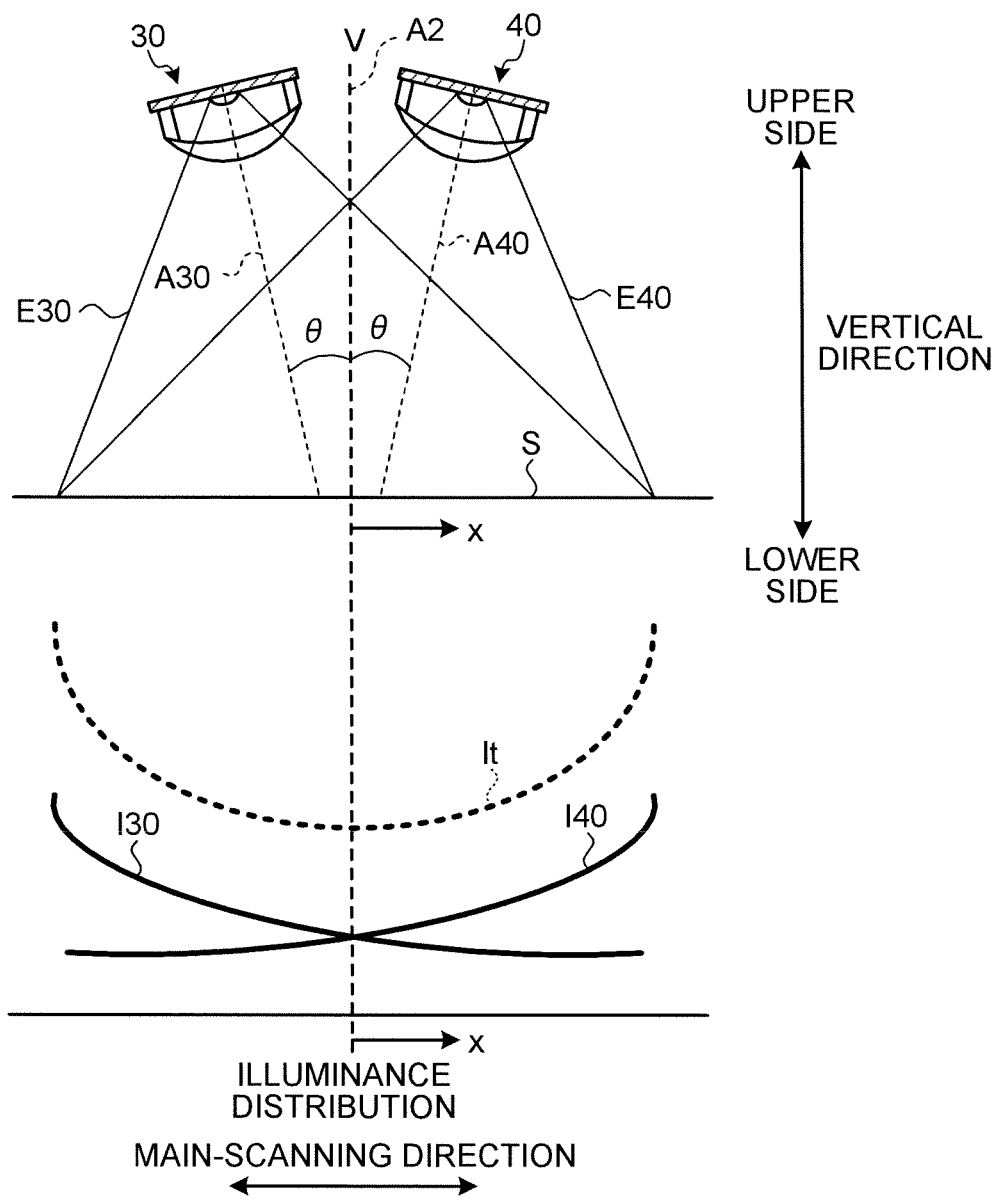
FIG. 11 depicts an illuminance distribution in a main-scanning direction of combined lighting.

FIG. 11 is a schematic of an illuminance distribution in the main-scanning direction of combined lighting of the lighting of the first lighting module 30 and the lighting of the second lighting module 40. FIG. 11 is a front view of the light source 21 when viewed from the sub-scanning direction. As shown in FIG. 11, the optical axis A2 of the imaging unit 22 is perpendicular to the placement surface 2 when viewed from the sub-scanning direction. On the other hand, each of an optical axis A30 of the first lighting module 30 and an optical axis A40 of the second lighting module 40 is tilted at the tilt angle θ with respect to the optical axis A2. The directions of the tilts of the first lighting module 30 and the second lighting module 40 are symmetric about the optical axis A2 of the imaging unit 22. The optical axes A30 and A40 of the first lighting module 30 and the second lighting module 40 are tilted in such a manner that the distance from the optical axis A2 increases in the main-scanning direction as they extend upward in the vertical direction. That is, the first lighting module 30 and the second lighting module 40 are tilted such that the center of each irradiation width is the center of the medium S to be read in the main-scanning direction.

Because of the tilt of the optical axis A30, the irradiation light E30 of the first lighting module 30 has an illuminance distribution I30 in which the illuminance decreases as the position goes from the first lighting module 30 side to the second lighting module 40 side in the main-scanning direction. Similarly, the irradiation light E40 of the second lighting module 40 has an illuminance distribution I40 in which the illuminance decreases as the position goes from the second lighting module 40 side to the first lighting module 30 side in the main-scanning direction. An illuminance distribution It of combined irradiation light of the irradiation light E30 and the irradiation light E40 has a shape in which the illuminance is a minimum in the optical axis A2 direction of the imaging unit 22. The illuminance distribution It of the combined irradiation light is a curve warped on the minimum illuminance side. The illuminance distribution It is determined based on the characteristic of the reading lens 26 as explained below with reference to FIG. 12. When the height position of the light source 21 is lowered so as to obtain a desired illuminance distribution It, the tilt angle θ may be set to be small, or the curvatures of the illuminance distribution I30 of the first lighting module 30 and the illuminance distribution I40 of the second lighting module 40 may be set to be large.

Figure 12:
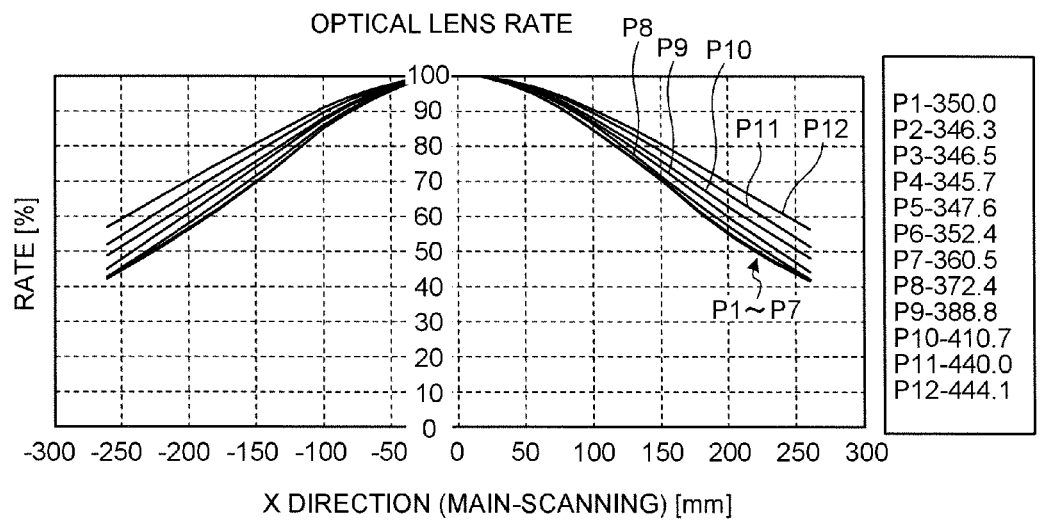
FIG. 12 depicts a characteristic of a reading lens.

FIG. 12 is a graph of a characteristic of the reading lens 26 of the imaging unit 22. FIG. 12 depicts curves each representing a rate of received light amount of each position of the light receiving surface 27a when light having uniform light amount is incident on the CCD 27 through the reading lens 26 from each position of the reading target line L. In FIG. 12, each of curves P1 to P12 is the rate of received light amount at the corresponding height position when the height position of the imaging unit 22 from the medium S to be read is changed. For example, the curve P1 represents the rate of received light amount when the height position of the imaging unit 22 is 350.0 mm. The height position of the light source 21 is defined as the height position of the light receiving surface 27a of the CCD 27.

As shown in FIG. 12, the received light amount is the maximum at the center in main-scanning direction, i.e., the position of the optical axis A2. The received light amount decreases as the position is away from the center in the main-scanning direction. Each of the curves P1 to P12 is the rate of the received light at each position in the main-scanning direction on the assumption that the received light amount at the position of the optical axis A2 is 100%. A change rate of the received light amount with the position in the main-scanning direction, i.e., a lowering level of the received light amount of the position with respect to the received light amount at the center, is smaller when the height position of the imaging unit 22 is higher.

Figure 13:
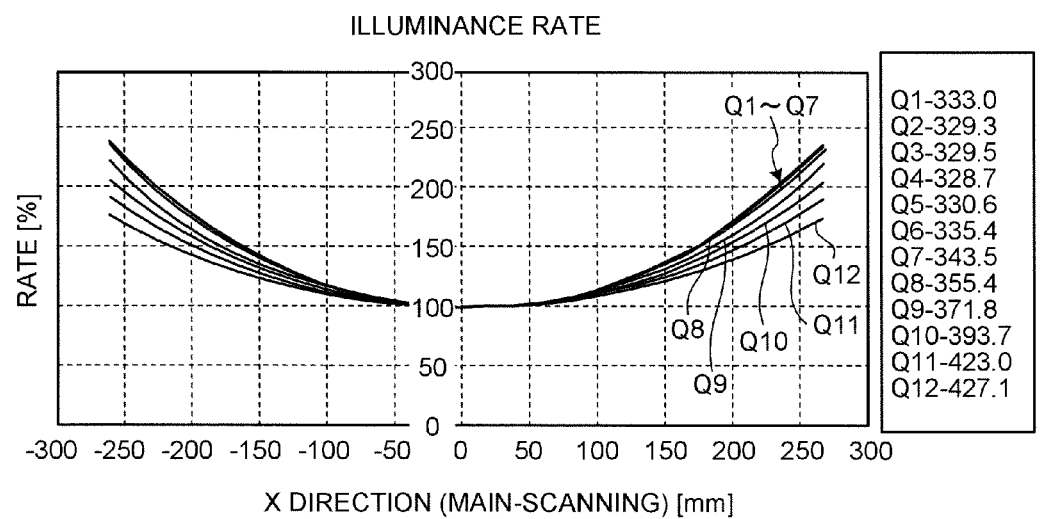
FIG. 13 depicts an illuminance distribution in the main-scanning direction of a light source.

FIG. 13 is a graph of illuminance distributions of the light source 21 in the main-scanning direction. FIG. 13 depicts curves each representing a rate of illuminance of light emitted from the light source 21 to the reading target line L at each position in the main-scanning direction. Curves Q1 to Q12 correspond to the curves P1 to P12 of FIG. 12 respectively. For example, the curve Q1 corresponds to the received light amount rate P1 when the height position of the imaging unit 22 is 350.0 mm. The curve Q1 can reduce unevenness of the distribution of received light amount of the light receiving surface 27a due to the characteristic of the reading lens 26. The curve Q1 is the rate when the height position of the light source 21 is 333.0 mm. The height position of the light source 21 is defined as the height position of the LED 31 or the LED 41.

As shown in FIG. 13, the illuminance is the minimum at the center in main-scanning direction, i.e., the position of the optical axis A2. The illuminance increases as the position is away from the center in the main-scanning direction. Each of the curves Q1 to Q12 is the rate of the illuminance at each position in the main-scanning direction on the assumption that the illuminance at the position of the optical axis A2 is 100%. As shown in FIG. 12, the unevenness of the light amount of the light receiving surface 27a due to the characteristic of the reading lens 26 is that light amount decreases as the position is away from the position of the optical axis A2 in the main-scanning direction. In contrast, the illuminance increases as the position is away from the position of the optical axis A2 in the main-scanning direction in the illuminance distribution of the light source 21. Therefore, the combination of the reading lens 26 and the light source 21 of the embodiment realizes at least one of suppression of received light amount at the position of the optical axis A2 or increase in received light amount at the position located away from the optical axis A2 in the main-scanning direction. As a result, the unevenness of the distribution of received light amount practically received by the CCD 27 in the main-scanning direction is reduced. The illuminance distributions Q2 to Q12 may be determined so as to reduce the unevenness of the light amount distribution of the light receiving surface 27a due to the characteristic of the reading lens 26 based on the received light amount distributions P2 to P12 in the same manner as described above.

Figure 14:
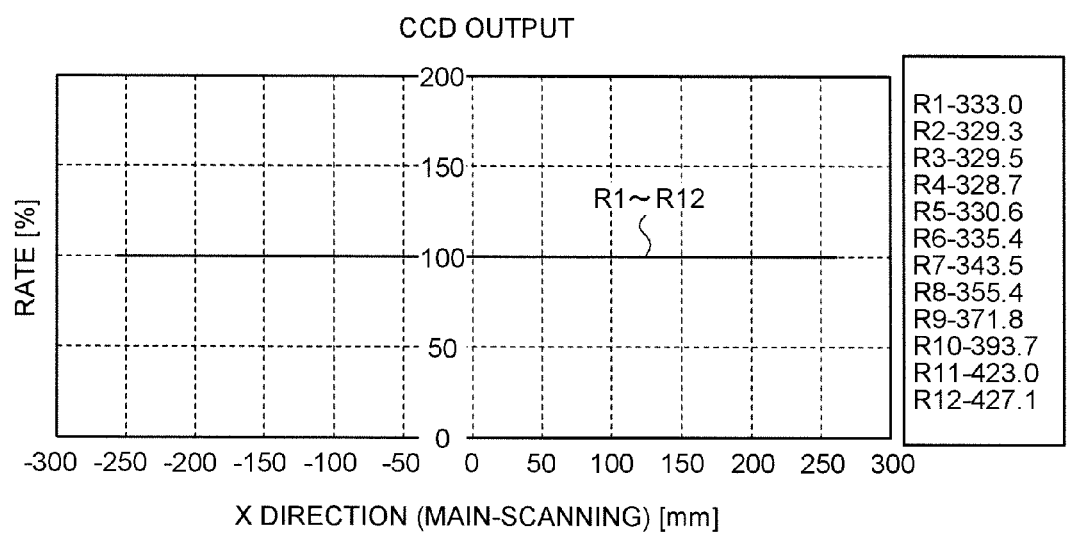
FIG. 14 depicts an output rate of a charge coupled device (CCD).

In the embodiment, the illuminance distribution of the light source 21 is determined so as to uniform the received light amount received by the CCD 27 in the main-scanning direction. FIG. 14 is a graph of an output rate of the CCD 27. FIG. 14 depicts a rate of a signal value output by each pixel of the CCD 27, i.e., a rate of received light amount of each pixel. Output rates R1 to R12 correspond to the curves P1 to P12 of FIG. 12 and the curves Q1 to Q12 of FIG. 13, respectively. For example, the output rate R1 is the rate of received light amount of each pixel of the CCD 27 when the height position of the imaging unit 22 is 350.0 mm and the imaging unit 22 reads the reading target line L irradiated with light having the illuminance distribution Q1. The illuminance distribution Q1 is determined so as to uniform the output rate R1 based on the received light amount rate P1. For example, the illuminance distribution Q1 is determined such that the illuminance rate is the reciprocal of the received light amount rate at each position in the main-scanning direction. As a result, the light amount distribution of the light receiving surface 27a can be uniformed in the main-scanning direction.

As for the first lighting module 30 and the second lighting module 40, the illuminance distribution (refer to FIG. 10) and the disposition with respect to the imaging unit 22 are designed for each lighting module so as to realize the determined illuminance distribution Q1. The illuminance distributions Q2 to Q12 may be determined so as to uniform the output rates R2 to R12 based on the received light amount distributions P2 to P12 in the same manner as described above.

In this way, the light source 21 and the imaging unit 22 according to the embodiment suppress the unevenness and fluctuation of the light amount distribution in the main-scanning direction and have an advantage of improving quality of images produced by the image reading apparatus 1.

In the embodiment, the light source 21 includes two lighting modules. The number of lighting modules, however, is not limited to two. The light source 21 may include a single lighting module or three or more lighting modules.

The light amount distribution of the reading lens 26 located at the front-end reading position differs from the light amount distribution of the reading lens 26 located at the rearmost reading position. The light source 21 is preferably designed so as to suppress the output rate change of the CCD 27 in the main-scanning direction over the entire movable area of the optical unit 20 as much as possible.

The image reading apparatus to which the embodiment is applicable is not limited to the image reading apparatus in which the light source 21 and the imaging unit 22 are mounted on the optical unit 20 such as the image reading apparatus 1 of the first embodiment. The set of the light source 21 and the imaging unit 22 of the embodiment is applicable to other overhead scanners.

For example, either the light source 21 or the imaging unit 22 may be disposed on the arm 12, the supporter 13, or the cover 14 so as to be isolated from the optical unit 20. When the light source 21 is disposed so as to be isolated from the optical unit 20, the light source 21 may be driven in synchronization with the rotation of the optical unit 20 so as to irradiate the reading target line L with light. Alternatively, the light source 21 may be fixed on the main body 10, for example, and irradiate the whole of the medium S to be read with light.

When the imaging unit 22 is disposed so as to be isolated from the optical unit 20, the optical unit 20 and the imaging unit 22 are controlled such that the optical unit 20 on which the light source 21 is mounted and the imaging unit 22 are rotated in synchronization with each other, for example. The imaging unit 22 may be fixed. For example, a reflective member such as a mirror may be provided so as to guide light reflected from the reading target line L to the imaging unit 22 and the medium S to be read may be scanned by light reflected from the rotating reflective member.

In the embodiments, the following image reading apparatus is disclosed.

The image reading apparatus includes the reading lens 26 that focuses on the light receiving surface 27a light reflected from the medium S to be read that is placed on the placement surface 2 located on the lower side in the vertical direction, the imaging unit 22 that images the medium S, and the light source 21 that irradiates the medium S with light. The illuminance distribution of the light source 21 on the medium S to be read reduces the unevenness of the light amount distribution of the light receiving surface 27a due to the characteristic of the reading lens 26.

The contents disclosed in the embodiments and the modification examples can be implemented by properly combining them.

An image reading apparatus according to the embodiments of the invention includes a rotation unit supported on a main body so as to be rotatable around a rotation axis, an imaging unit that is mounted on the rotation unit at an outward position in a radial direction of the rotation axis and images a medium to be read that is placed on a placement surface located under the rotation unit in the vertical direction, and a light source that irradiates the medium with light. The image reading apparatus according to the embodiments of the invention has effects that the change of the optical path length between the imaging unit and the medium to be read during reading of images is suppressed, and the suppression of increase in the size of the image reading apparatus and the reduction of the depth of field can be achieved together.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
a main body;
a rotation unit supported by the main body and configured to be rotatable on a rotation axis;
an imaging unit mounted on the rotation unit at an outward position in a radial direction of the rotation axis and configured to image a medium to be read while being rotated together with the rotation unit; and
a light source configured to irradiate the medium with light, wherein
the rotation unit is configured to position the imaging unit on the side of the medium relative to the rotation axis.

2. The image reading apparatus according to claim 1, wherein the light source and the imaging unit are arranged with a relative positional relationship capable of suppressing specular reflected light of light that is emitted from the light source and reflected by the medium to be read from being incident on the imaging unit.

3. The image reading apparatus according to claim 1, wherein the light source is mounted on the rotation unit.

4. The image reading apparatus according to claim 3, wherein, in the rotation unit, a distance between the rotation axis and the light source in the radial direction of the rotation axis is equal to or more than a distance between the rotation axis and the imaging unit in the radial direction of the rotation axis.

5. The image reading apparatus according to claim 3, wherein optical axes of the light source and the imaging unit do not intersect with the rotation axis, and
when the rotation unit is located at a position at which the imaging unit starts reading the medium to be read, the light source and the imaging unit face the placement surface in respective optical axis directions.

6. The image reading apparatus according to claim 3, wherein the imaging unit and the light source are arranged on a single virtual line parallel to the rotation axis.

7. The image reading apparatus according to claim 3, wherein the imaging unit and the light source are arranged on a single virtual line extending outward in the radial direction of the rotation axis from the rotation axis, in an axial direction view of the rotation axis.

8. The image reading apparatus according to claim 1, wherein
the main body includes a pedestal placed on the placement surface and an arm extending upward in the vertical direction from the pedestal, and
the rotation axis protrudes from an upper end of the arm in the vertical direction to a placement side on which the medium to be read is placed in relation to the pedestal.

9. The image reading apparatus according to claim 8, further comprising a cover mounted on the rotation axis of the rotation unit, wherein
a movable area of the rotation unit is on a side opposite the placement side on which the medium is placed in relation to a tangent line of the pedestal and the cover on the placement side.

10. The image reading apparatus according to claim 1, wherein
the imaging unit includes a lens that focuses light reflected from the medium to be read on a light receiving surface, and
an illuminance distribution of the light source on the medium to be read reduces unevenness of a light amount distribution on the light receiving surface due to a characteristic of the lens.

11. The image reading apparatus according to claim 10, wherein the illuminance distribution evens out the light amount distribution on the light receiving surface.

12. The image reading apparatus according to claim 1, wherein the rotation unit is configured to position the imaging unit on the side of the medium relative to the rotation axis when imaging the medium.

13. An image reading apparatus comprising:
a main body;
a rotation unit supported by the main body and configured to be rotatable around a rotation axis, the rotation unit extending from the rotation axis in a first direction;
an imaging unit mounted on the rotation unit at an outward position in the first direction and configured to image a medium while being rotated together with the rotation unit, an direction of an optical axis of the imaging unit being non-parallel with the first direction; and
a light source configured to irradiate the medium with light.

14. The image reading apparatus according to claim 13, wherein the first direction is perpendicular to the rotation axis.

15. The image reading apparatus according to claim 13, wherein the optical axis of the imaging unit is oriented to avoid receiving specular reflection light from the medium, the specular reflection light is being mirror-like reflection of the light originated from the light source.

16. The image reading apparatus according to claim 13, wherein the light source is mounted on the rotation unit, and the rotation unit is configured to rotate the light source and the imaging unit together when imaging the medium.

17. The image reading apparatus according to claim 16, wherein a position of the imaging unit in the rotation unit is distant from the rotation axis and is in the first direction of the rotation axis, a position of the light source in the rotation unit is distant from the rotation axis and is in the first direction of the rotation axis, and a distance between the rotation axis and the light source is equal to or greater than a distance between the rotation axis and the imaging unit.

18. The image reading apparatus according to claim 16, wherein the optical axis of the imaging unit does not intersect with an optical axis of the light source, and when the rotation unit is located at a position from which the imaging unit starts imaging the medium, the light source and the imaging unit both face the medium.

19. The image reading apparatus according to claim 16, wherein the imaging unit is aligned with the light source in a second direction parallel to the rotation axis.

20. The image reading apparatus according to claim 13, wherein the main body includes a pedestal placed on a surface, and an arm extending upwardly from the pedestal, the medium being placed on the surface, and the rotation axis is located in a position directly above the surface without presence of the pedestal between the rotation axis and the surface.

21. The image reading apparatus according to claim 13, wherein the rotation unit is configured to rotate the imaging unit between a first position and a second position in order for the imaging unit to image the medium.

22. The image reading apparatus according to claim 13, wherein the imaging unit comprises an imager and a lens for focusing light reflected from the medium on the imager, the light source is configured to emit the light having an illuminance distribution on the medium, and the lens has a characteristic to reduce unevenness of a light amount distribution on the imaging unit.

23. The image reading apparatus according to claim 22, wherein the illuminance distribution evens out the light amount distribution on the imager.

24. The image reading apparatus according to claim 22, wherein the optical axis of the imaging unit is maintained to be inclined with respect to a normal line of the medium.

25. An image reading apparatus comprising:

a main body;

a rotation unit supported by the main body and configured to be rotatable around a rotation axis, the rotation unit extending from the rotation axis in a first direction;

an imaging unit mounted on the rotation unit at an outward position in the first direction and configured to image a medium while being rotated together with the rotation unit, an optical axis of the imaging unit crossing the first direction; and a light source configured to irradiate the medium with light.

* * * * *

UNITED STATES PATENT AND TRADEMARK OFFICE
CERTIFICATE OF CORRECTION

PATENT NO.         : 8,854,700 B2                                     Page 1 of 1
APPLICATION NO.    : 13/369035
DATED              : October 7, 2014
INVENTOR(S)        : Keisuke Kimura It is certified that error appears in the above-identified patent and that said Letters Patent is hereby corrected as shown below:

In the Claims:

At column 18, claim number 13, line number 57, change "an direction" to a direction Signed and Sealed this
Tenth Day of February, 2015

Michelle K. Lee
*Deputy Director of the United States Patent and Trademark Office*